US006844847B2

(12) United States Patent
Gounon

(10) Patent No.: US 6,844,847 B2
(45) Date of Patent: Jan. 18, 2005

(54) METHOD AND DEVICE FOR INSTANTANEOUS DETERMINATION OF ORIENTATION, BASED ON SATELLITE POSITIONING SIGNALS

(75) Inventor: René Gounon, Chateau Thebaud (FR)

(73) Assignee: Thales, Paris (FR)

( * ) Notice: Subject to any disclaimer, the term of this patent is extended or adjusted under 35 U.S.C. 154(b) by 8 days.

(21) Appl. No.: 10/239,878

(22) PCT Filed: Apr. 12, 2001

(86) PCT No.: PCT/FR01/01138

§ 371 (c)(1),
(2), (4) Date: Oct. 4, 2002

(87) PCT Pub. No.: WO01/81943

PCT Pub. Date: Nov. 1, 2001

(65) Prior Publication Data

US 2003/0048220 A1 Mar. 13, 2003

(30) Foreign Application Priority Data

Apr. 21, 2000 (FR) .......................................... 00 05183

(51) Int. Cl.⁷ .............................................. H04B 7/185
(52) U.S. Cl. .................................. 342/357.11; 701/215
(58) Field of Search ...................... 342/357.11; 701/215

(56) References Cited

U.S. PATENT DOCUMENTS

| 4,963,889 A | * | 10/1990 | Hatch | 342/357.11 |
| 5,933,110 A | | 8/1999 | Tang et al. | 342/357.11 |
| 6,259,398 B1 | * | 7/2001 | Riley | 342/357.11 |

OTHER PUBLICATIONS

JC Juang et al.: "Development of GPS–based attitude determination algorithms" IEEE Transactions on Aerospace and Electronic Systems, vol. 33, No. 3, pp. 968–976 7/97.

RA Brown et al.: "Instantaneous GPS attitude determination" Proceedings of the Position Location and Navigation Symposium, vol. –, pp. 113–120 1992.

* cited by examiner

Primary Examiner—Gregory C. Issing
Assistant Examiner—F H Mull
(74) Attorney, Agent, or Firm—Oblon, Spivak, McClelland, Maier & Neustadt, P.C.

(57) ABSTRACT

Measurement of orientation of a mobile in space, for example the heading of a ship with the aid of receivers of satellite-based radio positioning signals. To obtain a measurement of orientation very rapidly, use is made of two reception antennas located at two points A and B whose distance D is known. First, n successive calculations of position of the point A with respect to the point B (for example a dozen successive calculations if the distance D is 40 centimeters) are performed based on a single set of 2p pseudo-distances measured between each antenna and p satellites. The n calculations correspond to n initial estimated positions serving as starting assumptions for the calculation. The n estimated positions are situated on a circle with center B and radius D. The calculated positions are situated at distances from the point B. A position is selected representing a true position of the point A while verifying that this position is on the circle with center B and radius D to within a few millimeters. The selection may possibly be improved by verifying the consistency of the measurement.

11 Claims, 3 Drawing Sheets

METHOD AND DEVICE FOR INSTANTANEOUS DETERMINATION OF ORIENTATION, BASED ON SATELLITE POSITIONING SIGNALS

BACKGROUND OF THE INVENTION

1. Field of the Invention

The invention relates to the precise and rapid determination of the orientation of a mobile in space.

2. Discussion of the Background

Typically, maritime navigation requires a knowledge of the heading followed by a ship, whether it be underway, manoeuvring or at rest. The heading information is information regarding the orientation of the longitudinal axis of the ship in a horizontal plane. The invention will be described chiefly in connection with the determination of the heading of a ship or of an aircraft, but it is applicable to other information regarding orientation of a mobile, including outside the horizontal plane: roll and pitch attitude information is another important piece of information, in maritime navigation and aerial navigation alike, although it generally has less need for precision than the heading information. The information regarding heading or orientation of a land vehicle is also important. Other exemplary applications may be envisaged such as information regarding orientation of, a crane, a weapon, etc.

The measurement of heading is traditionally performed with the aid of a magnetic compass, a gyroscopic compass or an inertial unit.

The magnetic compass requires corrections, due to the difference between geographical north and magnetic north, and due to the perturbing magnetic masses around the compass.

The gyroscopic compass, sustained electrically, is insensitive to magnetic variations, and is very widely used in ships. However, the difficulties of installation, the reduction in precision at high latitudes, mechanical servicing and the expense when high precision is desired, are considerable handicaps. Inertial units deliver a quality measurement but are expensive and have to be periodically reset with the aid of other means of measurement.

The use may also be envisaged, for the determination of orientation, of means for measuring position by satellites, using for example the radio signals transmitted by the satellites of the GPS (Global Positioning System) system.

By using several reception antennas located at different points of the ship (or of the aircraft), and by determining through differential measurements the relative positions of the antennas, it is possible to determine the attitude in terms of heading, roll, and pitch. The precision obtained under favourable conditions of reception may be 3 milliradians in heading and 6 to 8 milliradians in roll or pitch, as a function of the distance between the antennas.

However, hitherto a considerable time (several minutes) was necessary in order to obtain the desired precise information. This is no impediment for a ship making way out at sea, but it may be crippling under other conditions, for example for a ship manoeuvring in the area of a port where the reception of signals from satellites is frequently cut off by obstacles (bridges, cranes, etc.).

SUMMARY OF THE INVENTION

An important aim of the invention is therefore to propose a process and a device making it possible to obtain heading information for a mobile vehicle, or more generally orientation information for an object, very rapidly.

Another aim of the invention is to reduce the complexity of the device for determining orientation by using just a single one of the radio frequency bands transmitted by the satellites of satellite-based positioning systems. Conventionally, the satellites of these systems (in particular the GPS system) transmit on two frequency bands generally designated L1 and L2 and it is known that the obtaining of reliable information regarding position can be speeded up by using the second frequency, but naturally at the cost of increased complexity which the present invention seeks to avoid. The invention makes it possible to obtain, by using a single one of the frequency bands, more rapid information than that obtainable nowadays by using both bands. However, if for other reasons there is a need to use both frequency bands, the invention is compatible with the use of both bands.

To achieve these aims, the invention proposes a process for determining the orientation of a mobile, using two antennas for receiving radio signals emanating from positioning satellites, which antennas are placed at two fixed points A and B of the mobile, the two points separated by a known fixed distance D, this process comprising the periodic determination of a set of 2p pseudo-distances, p pseudo-distances between each antenna and p satellites, the delivery of the 2p pseudo-distances to a position calculating facility, and the calculation by this facility of a relative position of the point A with respect to the point B on the basis, on the one hand, of the pseudo-distances and, on the other hand, of an estimated relative position of the point A with respect to the point B, this process being characterized in that the calculation of relative position of the point A comprises, for a given set of 2p pseudo-distances received by the calculating facility:

n calculations (n is an integer >1) of relative position of the point A, respectively involving n initial estimated positions $Ae_1$ to $Ae_n$, all situated at the same distance D from the point B but corresponding to n different orientations about the point B, the n calculations delivering n calculated positions $Ac_1$ to $Ac_n$ of the point A, the calculation of the distances $d_1$ to $d_n$ between each calculated position and the point B, the selection of a calculated position $Ac_k$ from among the n calculated positions, such that the discrepancy ($d_k$-D) between the corresponding distance $d_k$ and the distance D is less in absolute value than a specified threshold, the direction of the vector $BAc_k$ representing the sought-after orientation information.

Consequently, instead of searching for the relative position of the point A through a lengthy, for example iterative, procedure involving successive sets of pseudo-distances until a satisfactory solution is obtained, n different calculations are performed with a single set of pseudo-distances and the most suitable solution is selected by using the available prior knowledge of the actual distance between the points A and B. This prior knowledge makes it possible to eliminate all the solutions which seem to be exact since they satisfy the conventional validity criteria, but are not exact. In the prior art, only subsequent calculations, performed on new sets of pseudo-distances, made it possible to eliminate them progressively over long durations.

Here, for example, if it is assumed that a set of pseudo-distances on the L1 band is delivered every 100 milliseconds, that a position calculation lasts a few milliseconds, that n is equal to roughly 12, and that the operations of calculation and of comparison of distances last a few milliseconds, it is seen that orientation information is obtained within the duration of 100 milliseconds and that it is therefore possible to obtain new orientation information for each new set of pseudo-distances. It is therefore possible to speak of quasi-instantaneous orientation measurement, calling upon a single frequency band (in principle L1) of the satellites.

As will be explained hereinbelow, the respective position calculation, for each of the n calculations, can be undertaken in two steps, a step of coarse determination using only some of the 2p pseudo-distances (those which correspond to the satellites least sensitive to errors in estimated position) and using a respective one of the n initial estimated positions $Ae_1$ to $Ae_n$ to calculate a respective approximate position ($Ap_1$ to $Ap_n$) of the point A, and a second step of more accurate calculation, using all the 2p pseudo-distances and using as estimated positions the respective approximate position ($Ap_1$ to $Ap_n$) which has been calculated in the first step.

Preferably, the n initial estimated positions are separated from one another by a distance less than or equal to the wavelength $\lambda$ of the carrier frequency of the signals emanating from the satellites.

For the determination of a heading (orientation in the horizontal plane only), the n initial estimated positions are distributed at least around a circle with centre B and radius D. The number n is then at least equal to the integer part of $1+2\pi D/\lambda$ if one wishes the distances between successive estimated positions to be less than $\lambda$.

For example, if the wavelength is roughly 20 cm and if the distance D is roughly 40 cm, then roughly 12 or 13 initial estimated positions on the circle will be used.

In the case where the ship exhibits considerable roll or pitch, provision may be made for the n positions to be distributed over a spherical annulus and not only over a circle. For a distance D of 40 cm and a wavelength of 20 cm, it is then possible in fact to take a number n of from 25 to 50 initial estimated positions, all at the distance D from the point B, and distributed over this spherical annulus.

To select a calculated position from among the n positions, it is firstly verified that this position is practically at the distance D from the point B, but other criteria may be invoked in order to eliminate a position which might be at the right distance or nearly so but which does not meet these other criteria.

Among these other criteria there is the consistency of the position measurement over the p satellites when there are more than four satellites. A calculation of position by satellite is generally accompanied by a calculation called "calculation of residuals", culminating in a value of consistency between the pseudo-distances measured for each satellite. Positions whose consistency value is not satisfactory will be eliminated.

Another criterion, applicable in the case of the measurement of a ship's heading in the presence of roll or pitch, is as follows: the angle of roll or pitch defined by the calculated position of the point A relative to the point B is calculated, and the calculated position is eliminated if the angle of roll or pitch exceeds a specified threshold corresponding to an angle of roll or pitch which is unlikely or too big to allow a good measurement of the heading.

Finally, the subject of the invention is not only the process for determining orientation, the main outline of which has just been described, but also a device for determining the orientation of a mobile capable of implementing this process. The device according to the invention comprises at least two antennas for receiving satellite-based positioning signals, which antennas are fixed on the mobile at two points A and B separated by a distance D, means of periodic determination of a set of 2p pseudo-distances between the point A and p satellites on the one hand, between the point B and the p satellites on the other hand, means for delivering the pseudo-distances to a position calculating facility, means for performing n calculations of relative position of the point A with respect to the point B on the basis of n initial estimated positions and of a set of 2p pseudo-distances, the n initial estimated positions all being situated at a distance D from the point B, means for calculating the distance $d_1$ to $d_n$ between the n positions $A_1$ to $A_n$ thus calculated and the point B, means for selecting a calculated position $Ac_k$ from among n, such that the discrepancy between the distance $d_k$ and the distance D is less in absolute value than a specified threshold, and means for calculating the direction of the vector $BAc_k$, this direction representing information regarding the sought-after orientation.

Other characteristics and advantages of the invention will become apparent on reading the detailed description which follows and which is given with reference to the appended drawings, in which:

DESCRIPTION OF THE PREFERRED EMBODIMENTS

The device for determining orientation set up for example on a ship comprises two antennas 10 and 12 whose centres are situated at positions A and B which are fixed with respect to the ship in such a way that there is a one-to-one relationship between the direction of the vector BA and the orientation of the ship. The vector BA can be situated along a horizontal longitudinal axis of the ship, in which case there is identity between the direction of the vector BA and the heading when the boat is horizontal. However, the vector BA can have any other direction, provided that this direction has a horizontal component which alone makes it possible to deliver a heading. In the example represented, the vector BA is horizontal and perpendicular to the longitudinal axis of the ship, so as also to allow a determination of the roll. The distance BA may be a few tens of centimeters to a few meters.

If one wishes to obtain complete information regarding attitude (heading, roll and pitch) a third antenna is necessary, not represented, at a position C which is not aligned with BA, and the relative position of the point C is calculated exactly in the same way as the position of the point A (the point B being assumed to be the reference of the relative positions).

The antennas may be fixed on a mast of the ship.

The radio signals emanating from the positioning satellites (GPS or other system) are received by the antennas and used by an electronic assembly 14.

Figure 1:
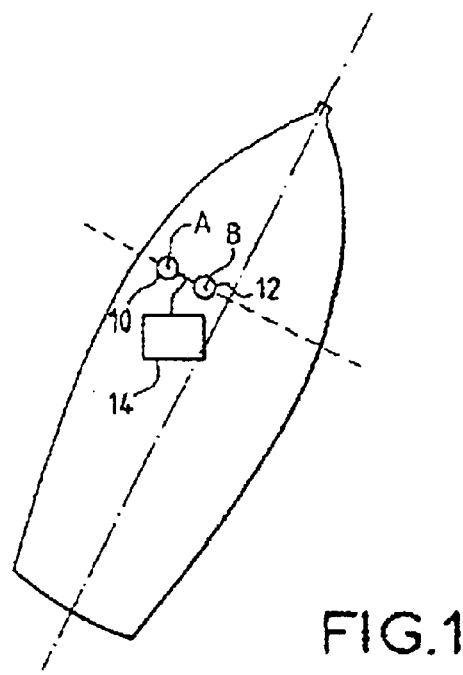
FIG. 1 diagrammatically represents the installation of a device according to the invention on a ship.
Figure 2:
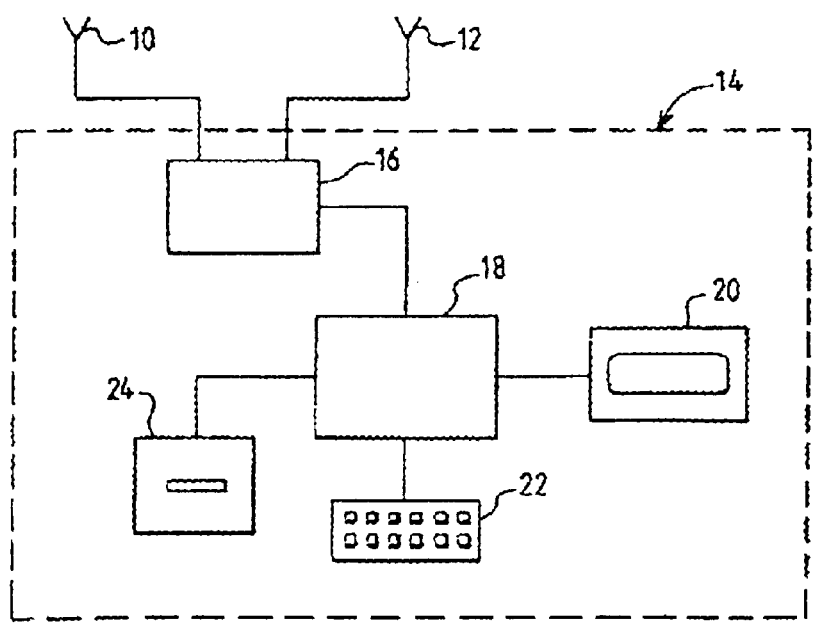
FIG. 2 represents the device according to the invention.

This electronic assembly 14 firstly comprises (FIG. 2) a satellite-based positioning receiver 16 capable of determining measurements of pseudo-distances between an antenna and several satellites. The term pseudo-distances should be understood to mean the measurement of radio propagation time between the satellite and the antenna, possibly affected by clock synchronization errors which are conventionally eliminated by calculation, provided that the signals are received from at least four different satellites. The propagation time is determined both by reference to a benchmark instant of the pseudo-random code which modulates a carrier frequency transmitted by the satellite, and with reference to the phase of the carrier received, the phase-related measurement, which is less noisy than the code-related measurement, being alone significant in the framework of the invention because the antennas are very close together.

The receiver 16 periodically delivers (for example every 100 milliseconds) a set of 2p pseudo-distances when p satellites are in direct view. These 2p pseudo-distances correspond to p pseudo-distances from the p satellites to the first antenna (point A) and p pseudo-distances from the p satellites to the second antenna (point B).

The receiver 16 can consist of two parts, dedicated one to the first antenna so as to deliver p pseudo-distances, and the other to the second antenna so as to simultaneously deliver p other pseudo-distances. However, it is also possible to have a single part connected to the two antennas by way of a multiplexer so as firstly to determine the p first pseudo-distances then the p other pseudo-distances. In this case, the receiver naturally refers the two collections of pseudo-distances to one and the same measurement instant before delivering the complete set of 2p pseudo-distances.

The receiver 16 delivers the 2p pseudo-distances to a facility for calculating relative position 18, the function of which is to determine the precise position of the antenna 10 (point A) with respect to the antenna 12 (point B), and to deduce therefrom the desired orientation information. It will be noted that the receiver and the calculation facility can use one and the same microprocessor, but that these two elements have been represented separately so that understanding is simplified.

The calculation facility 18 is programmed to perform the desired calculations and is linked to the peripheral facilities required according to the applications: display 20, keyboard 22, data or program reader/recorder 24, means of wire or radio transmission to a user, or simple interface for output to a line for transmission of the result of the calculations.

The calculation means provided in the calculation facility are able to perform the operations which will be detailed hereinbelow, on the basis of a set of 2p pseudo-distances delivered at a given instant by the receiver 16.

The position calculation is differential, that is to say the position of the point A is determined with respect to the point B and not with respect to an independent terrestrial benchmark. It may therefore be regarded in what follows that the position calculation consists in calculating the position of the point A on the basis of differential measurements of pseudo-distances, by taking differences of pseudo-distances measured at the point A and at the point B. This point will be further elucidated hereinafter by also invoking a concept of double differences of pseudo-distances (differences between pairs of satellites).

Overall, under the proviso of the conventional concept of double difference which will be further elucidated hereinafter, the principle of differential calculation is as follows:

the positions of the satellites at the measurement instant t are calculated by virtue of the ephemerides of the satellites;

the differential distances between the points A and B along the sighting axes of the satellites are determined on the basis of the differential measurements of pseudo-distances. Distances are obtained which may be regarded overall as the projections, along these axes, of the distance between A and B; these are measured distances;

the distances along the same axes between the point B and estimated positions of the point A (that is to say, position assumptions of which more will be said hereinafter) are calculated in parallel; these are estimated distances;

the difference between the measured distance and the estimated distance is determined along each axis, this difference being referred to as the discrepancy magnitude or "innovations" along this axis;

the discrepancies in longitude, latitude and altitude between the measured position of the point A and the estimated position are calculated on the basis of these discrepancy magnitudes, with the aid of the matrix of direction cosines representing the directions of the sighting axes of the satellites;

the calculated discrepancies are added to the initial estimated position, and a calculated position of the point A is obtained which is either a definitive position, or a new estimated position with a view to a subsequent calculation step as will be seen hereinafter;

the definitive values of position of the point A are converted into desired information regarding orientation (heading, roll, for example).

It may therefore be seen that this type of calculation involves estimated positions. An essential element of the present invention resides in the fact that several calculations of position of the point A are executed in succession on the basis of the same set of pseudo-distances by using various initial estimated positions, and in the fact that a result is selected from among the various calculations performed for the same set of pseudo-distances.

Hence, an explanation will firstly be given of the conditions for choosing initial estimated positions and for selecting the result before giving further details regarding a manner of implementing the calculations in a preferred exemplary embodiment of the invention.

Figure 3:
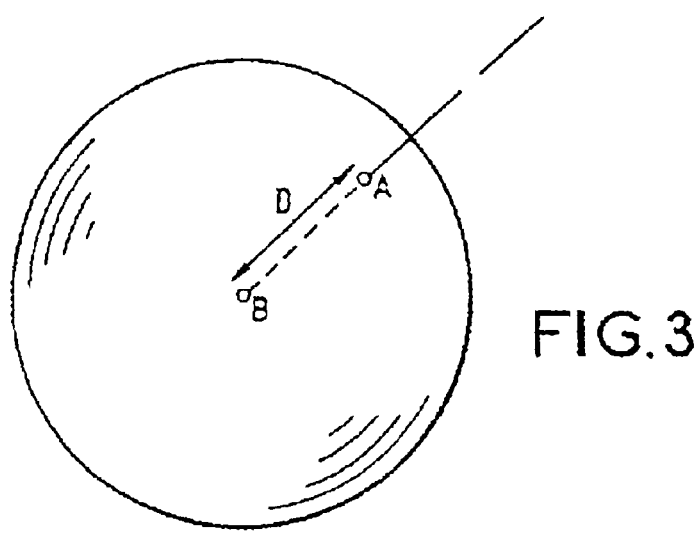
FIG. 3 represents the sphere of possibilities of positions of the point A about the point B.
Figure 4:
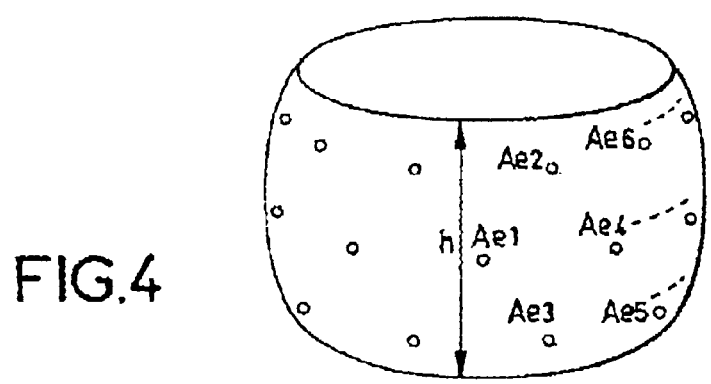
FIG. 4 represents a distribution of initial estimated positions over a spherical annulus.

FIG. 3 represents the sphere with centre B and radius D on which may be found the point A according to the orientation of the mobile in the terrestrial benchmark, where D represents the perfectly known distance between the centres A and B of the antennas fixed to the ship. However, for a maritime application, it may in fact be considered that the point A can move on a spherical annulus (FIG. 4) whose height h is defined by the maximum roll which the ship can exhibit.

Distributed along this spherical annulus and designated by $Ae_1$ to $Ae_n$, n estimated positions of the point A are choosen. These positions are starting assumptions for the calculation of the actual position of the point A.

To simplify the explanations, it will be considered that the ship has only very little roll or pitch, or else that the measurements of heading are validated only in the phases where the inclination of the ship is small.

Figure 5:
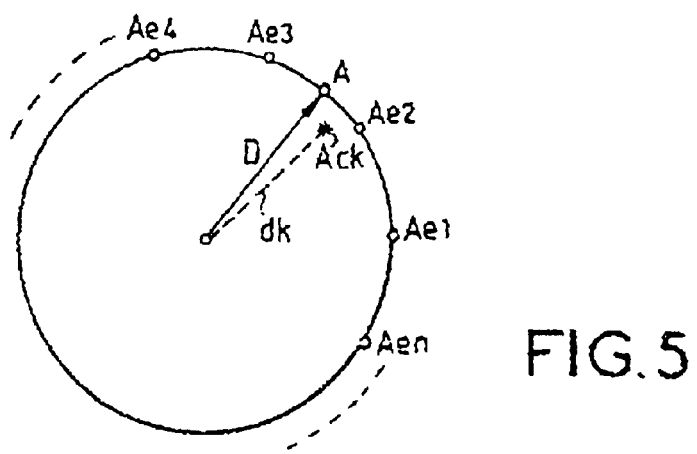
FIG. 5 represents a distribution of these positions over a circle.

In this case, it is merely necessary to distribute the estimated positions on the periphery of a horizontal circle of centre B and radius D. It is this configuration which is represented in FIG. 5.

The successive positions are separated by a distance which, preferably, does not exceed the wavelength $\lambda$ of the carrier frequency of the satellite signal (roughly 20 cm for the frequency L1 of the GPS system, only the frequency L1 needing, moreover, to be used to achieve the desired fast determination of heading). The number n of estimated positions is then at least equal to the integer part of $1+2\pi D/\lambda$ so as to cover the entire circle, for example at least 12 or 13 positions for D=40 cm (typical value). If allowance were made for the necessity of making measurements of heading even in the presence of a considerable inclination of the ship, it would be possible to choose roughly 25 to 50 initial estimated positions, instead of 12 or 13, on the spherical annulus of FIG. 4 and not on the circle of FIG. 5. These successive positions would still be separated by roughly $\lambda$ or less.

When the difference between the calculated position of the measurement point and the estimated position (which serves in this calculation) is less than half the wavelength of the carrier frequency, the quality of the calculation is regarded as sufficient in order for the calculated position to correspond with certainty to the actual position. This is the reason for choosing the spacing of roughly λ between the successive estimated positions. It is obvious that these positions could be brought closer together, and this would merely raise this certainty, but this would make it necessary to increase the number n of position calculations performed for each set of measurements of pseudo-distances. A spacing greater than λ can even be envisaged, in particular in certain favourable configurations of the constellation of satellites. The choice of a spacing almost equal to the wavelength is a good compromise between safety and calculation time.

Hence, the first initial estimated position, $Ae_1$, is used as a start, the position of the point A is calculated on the basis of this estimated position according to the principle of calculation set forth overall hereinabove and which will be detailed hereinafter, and this culminates in a calculated position $Ac_1$ which does not necessarily lie on the circle (or on the sphere) of the estimated positions. At the same time as the position $Ac_1$ of the point A is calculated, an evaluation of the validity of this measurement is also calculated. This evaluation is conventional in the realm of GPS. It is based in general on calculating the mean square value of the residuals and it leads to a higher or lower consistency value representing the greater or lesser reliability of the measurement; the consistency value can quite simply be the inverse or opposite of this square value. The residuals are the distances between the position of the calculated point and the straight lines representing the linear equations serving for the determination of the calculated point when there are more equations than unknowns (more than four satellites).

The position calculation is done again $Ac_1, Ac_2 \ldots Ac_n$, starting from each estimated position $Ae_1, Ae_2 \ldots Ae_n$, always with the same set of pseudo-distances. The consistency value of the measurement is also calculated each time.

The corresponding distance $d_1$ to $d_n$ with respect to the point B is calculated for each position $Ac_1$ to $Ac_n$, and this distance is compared with D since it is known that the sought-after position of the point A ought to be on the sphere with centre B and radius D.

The positions for which the discrepancy $d_1$–D to $d_n$–D between the distance to B and the known value D exceeds a specified threshold (for example 1 centimeter for a distance AB of 40 centimeters) are eliminated.

The positions for which the consistency value of the measurement is below a given threshold are, also preferably eliminated.

Positions not complying with certain criteria related to the application may also be eliminated: for example, for the measurement of the heading of a ship, in which the vector AB connecting the antennas is perpendicular to the longitudinal axis of the ship, and the measurement is therefore sensitive to roll, it is possible either to eliminate purely and simply the position measurements made while the roll inclination is greater than a small given value (for example 10°); it is then sufficient to calculate the distance AB projected in the vertical plane and to compare it with a threshold; this implies that the measurement of heading is made only when the ship is almost horizontal;

or to accept the measurements made when the ship is inclined (in particular in the case where the measurement of the heading and the roll are of interest) but to eliminate the measurements when they indicate (on account of measurement errors) a roll value which does not seem plausible for the ship; the measurements whose result indicates a roll greater than a much higher threshold (for example 30°) are then rejected.

What has just been stated in respect of roll can obviously be carried over to pitch if the vector BA is on the longitudinal axis of the ship.

In all cases, these threshold values can be parameterized and adapted to the type of ship or to the conditions of navigation, and of course to the application envisaged when not dealing with a ship.

The n calculations performed on the set of pseudo-distances are carried out in a very short time, for example less than 100 milliseconds. In general, this will lead to the selection of a single value of calculated position $Ac_k$ satisfying the various criteria.

If several values satisfying the various criteria are found, or conversely if no satisfying value is found, a new measurement performed on a set of different pseudo-distances is awaited. However, in a variant of the invention, one may prefer to retain the same set of pseudo-distances and redo a series of n other calculations, taking positions $A'e_1$ to $A'e_n$ interposed regularly mid-way between the previous positions $Ae_1$ to $Ae_n$ as initial estimated positions. The probability of obtaining a unique satisfying measurement in this second attempt becomes very high.

Figure 6:
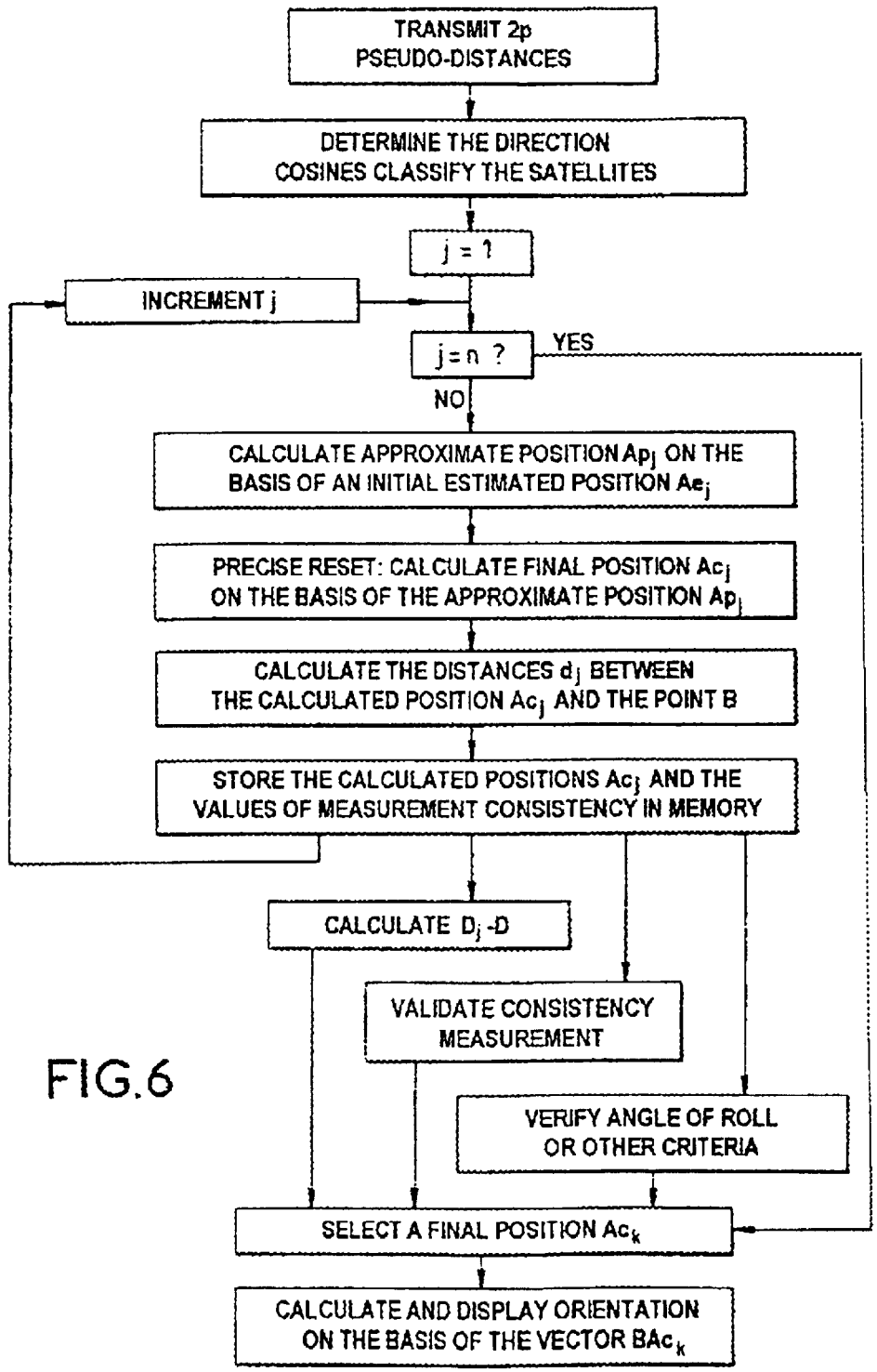
FIG. 6 represents a flowchart of the calculations performed.

The detail of the calculation which can be done to obtain the various positions will now be given by way of example, showing precisely how the initial estimated position is involved in this calculation. FIG. 6 diagrammatically represents the broad phases of the calculations performed.

Each of the n calculations is preferably done in two phases, a phase of obtaining an approximate position $Ap_1$ to $Ap_n$ followed by a phase of precise resetting to obtain the calculated position $Ac_1$ to $Ac_n$; the selection of a measurement satisfying the various criteria is performed only with regard to the calculated final positions $Ac_1$ to $Ac_n$.

The phase of obtaining an approximate position $Ap_1$ to $Ap_n$ uses an initial estimated position $Ae_1$ to $Ae_n$; and it uses just a subset of 2p' pseudo-distances chosen from the set of 2p pseudo-distances.

More precisely, the geometry of visibility of the p satellites at the instant of the measurement being known by virtue of the ephemerides, the pairs of satellites can be ranked in the order of their increasing sensitivity to errors. Only the p' satellites corresponding to the least sensitive pairs are taken, p' preferably being equal to four to simplify the calculations. An approximate position intermediate between the initial estimated position and the true position can be obtained through this technique.

The calculation of the positions is performed by a double-difference processing, on the 2p' pseudo-distances.

The so-called "double-difference" processing consists in working not directly on the basis of the pseudo-distances but on the basis of differences between pseudo-distances.

More precisely, the double differences of the type DDij=(Dia-Dja)-(Dib-Djb) are calculated, in which:

Dia is the pseudo-distance from the point A to the satellite of rank i

Dja is the pseudo-distance from the point A to the satellite of rank j

Dib is the pseudo-distance from the point B to the satellite of rank i

Djb is the pseudo-distance from the point B to the satellite of rank j

The differences of the type Dia-Dja or Dib-Djb make it possible to eliminate the errors which are common to the satellites. The differences between these differences, or double differences DDij, make it possible to eliminate the errors due to atmospheric or ionospheric propagation, and the clock differences between the satellites and the receiver.

These measured differences DDij are compared with similar differences calculated (and not measured) on the basis of the initial estimated positions. The difference which results from this comparison is called INNOVij, representing the discrepancy between the estimate and the measurement.

These discrepancies are connected with the discrepancies in longitude, latitude and altitude DL, DG and DA between the estimated position (here the initial position $Ae_1$ to $Ae_n$) and the calculated position (here the approximate calculated position $Ap_1$ to $Ap_n$) through equations of the type $$INNOVij=DJ[\cos(Evi)\cos(Azi)-\cos(Evj)\cos(Azj)]+DG[\cos(Evi)\sin(Azi)-\cos(Evj)\sin(Azj)]+DA[\sin(Evi)-\sin(Evj)]$$

where Evi, Evj are the elevations of the satellites i and j, and Azi, Azj their azimuths.

A simple calculation, or a matrix calculation with minimization of errors by the least squares technique if there are more than four satellites, makes it possible to determine DL, DG and DA which represent discrepancies between measured position and estimated position. These discrepancies are added to the longitude, the latitude and the altitude of the estimated point (here one of the points $Ae_1$ to $Ae_n$) to obtain a calculated point (here an approximate point $Ap_1$ to $Ap_n$).

An approximate position is obtained for each estimated position, and a second calculation step is performed on the basis of this approximate position. The second step is very similar to the first, but it uses all the 2p pseudo-distances it uses the approximate positions $Ap_1$ to $Ap_n$ rather than the initial estimated positions $Ae_1$ to $Ae_n$ as estimated position it uses for the calculation of the final positions $Ac_1$ to $Ac_n$ a matrix calculation with a number of equations which is greater than the number of unknowns (the number p of satellites being assumed to be greater than 4); the determination of the discrepancies DL, DG and DA between estimated position and calculated position can then be done conventionally by a method of least squares (the position determined by calculation is that which minimizes the mean square value of the residuals).

It is in the course of this calculation of final position that the consistency value of the measurement is determined (for example the inverse of the mean square value of the residuals), with a view to confirming the selection of a position measurement from among the n calculated positions.

The selection of a definitive position $Ac_k$ is then done by calculation of the distances to the point B, comparison with a threshold, verification of the consistency value, possible selection with regard to other supplementary criteria such as maximum roll (or maximum pitch if the line AB is on the longitudinal axis of the ship) as explained hereinabove.

The direction of the vector $BAc_k$ defines the sought-after orientation. Its projection in the horizontal plane defines the heading (to within a rotation, known by initial calibration, if the vector BA is not on the longitudinal axis of the ship).

What is claimed is:

1. Process for determining a sought-after orientation of a mobile, using two antennas for receiving radio signals emanating from positioning satellites, which antennas are placed at two fixed points A, B of the mobile, the two points being separated by a known fixed distance D, comprising:

periodically determining a set of 2p pseudo-distances, p pseudo distances between each antenna and p satellites;

delivering the pseudo-distances to a position calculating facility; and calculating, by the position calculating facility, a relative position of the point A with respect to the point B based on the pseudo-distances and an estimated position of the point A with respect to the point B, wherein, for a given set of 2p pseudo-distances received by the calculating facility, the calculating of relative position comprises:

performing n successive calculations (n>1) of relative position of the point A, respectively involving n initial estimated positions all situated at a same distance D from the point B but corresponding to n different orientations about the point B, the n calculations delivering n calculated positions of the point A, calculating distances between each calculated position and the point B, selecting a calculated position such that a discrepancy between the corresponding distance and the distance D is less than a specified threshold, wherein the selected position is the relative position, whereby the direction of a vector linking point B to the selected calculated position represents the sought-after orientation.

2. Process according to claim 1, wherein the n successive calculations are performed in two steps for each of the n successive calculations, wherein:

in a first step, a calculation of approximate position is performed based on one of the n initial estimated positions and of a subset of 2p' pseudo-distances corresponding to p' satellites, in which p' is less than p and the p' satellites chosen from a constellation of the p satellites are those which, given a current geometry of the constellation, have lowest sensitivity to an estimated position error, in a second step, a calculation of relative position of the point A is performed based on a complete set of 2p pseudo-distances and an estimated position of the point A which is the approximate position calculated in the first step.

3. Process according to claim 1, wherein the n initial estimated positions are separated from one another by a distance less than or equal to a wavelength of a carrier frequency of signals emanating from the satellites.

4. Process according to claim 1, wherein the n calculations of positions of the point A are each accompanied by a calculation of residuals delivering a numerical evaluation of a consistency of the measurement, and wherein the consistency is compared with a threshold to eliminate a calculated position if the compared consistency is less than the threshold.

5. Process according to claim 1, for measurement of a ship's heading in a presence of roll or pitch, wherein an angle of roll or pitch defined by the calculated position of the point A relative to the point B is calculated, and the calculated position is eliminated if the angle of roll or pitch exceeds a specified threshold.

6. Process according to claim 1, wherein for a determination of a heading, the n initial estimated positions are distributed at least along a horizontal circle with center B and radius D.

7. Process according to claim 1, wherein if the wavelength of the carrier frequency of the signals emanating from the satellites is $\lambda$, then a number n is roughly equal to an integer part of $1+2\pi D/\lambda$.

8. Process according to claim 1, wherein the position calculations comprise prior calculation of double differences, each double difference being of type (Dia-Dja)-(Dib-Djb) in which Dia and Dib represent pseudo-distances of the points A and B from a satellite of rank i, and Dja and Djb represent pseudo-distances of the points A and B from a satellite of rank j, the position calculations being performed based on the double differences and the estimated positions.

9. Process according to claim 1, wherein in a case in which none of the n measurements is validated by the selection operation, n other calculations are executed based on n other initial estimated positions interposed between the first initial estimated positions.

10. Process according to claim 1, wherein in the case in which plural measurements are validated by the selection operation, n other calculations are executed based on n other initial estimated positions interposed between the first initial estimated positions.

11. Device for determining a sought-after orientation of a mobile, comprising:

- at least two antennas configured to receive satellite-based positioning signals, which antennas are fixed on the mobile at two points A and B separated by a known fixed distance D;
- means for periodic determining a set of 2p pseudo-distances, p pseudo-distances between the point A and p satellites, and p pseudo-distances between the point B and the p satellites;
- means for delivering the determined pseudo-distances to a position calculating facility;
- means for performing n calculations (n>1) of relative position of the point A with respect to the point B based on n initial estimated positions and of a set of 2p pseudo-distances, the n initial estimated positions all being situated at a distance D from the point B;
- means for calculating the distance $d_1$ to $d_n$ between the n positions thus calculated and the point B;
- means for selecting a calculated relative position from among n, such that a discrepancy between the distance $d_k$ and the distance D is less than a specified threshold; and
- means for calculating a direction of a vector linking point B to the selected calculated position, said direction representing information regarding the sought-after orientation.

* * * * *